United States Patent [19]
Gordon

[11] Patent Number: 4,643,658
[45] Date of Patent: Feb. 17, 1987

[54] EXPANDING MANDREL

[76] Inventor: John H. Gordon, 855 Brandywine Rd., Downingtown, Pa. 19335

[21] Appl. No.: 654,849

[22] Filed: Sep. 26, 1984

[51] Int. Cl.4 ...................... B29C 51/30; B29C 51/10
[52] U.S. Cl. .................................... 425/110; 425/388; 425/393; 425/403; 425/441; 425/445; 425/457; 425/DIG. 218
[58] Field of Search ............... 425/388, 392, 393, 417, 425/457, 110, 112, 500, 403, 403.1, 441, 445, DIG. 218, 387; 249/180, 184

[56] References Cited

U.S. PATENT DOCUMENTS

| | | | |
|---|---|---|---|
| 3,248,756 | 5/1966 | Mills et al. | 425/392 |
| 3,960,472 | 6/1976 | O'Connor | 425/393 |
| 3,966,385 | 6/1976 | Spears | 425/393 |
| 4,030,872 | 6/1977 | Parmann | 425/393 |
| 4,063,862 | 12/1977 | Johansson | 425/403 |
| 4,080,140 | 3/1978 | Wilson et al. | 425/393 |
| 4,107,249 | 8/1978 | Murai et al. | 425/393 |
| 4,170,448 | 10/1979 | French | 425/393 |
| 4,204,823 | 5/1980 | Hayes et al. | 425/393 |
| 4,218,208 | 8/1980 | Hayes et al. | 425/393 |
| 4,238,180 | 12/1980 | Gordon et al. | 425/393 |
| 4,239,473 | 12/1980 | Fulhaber | 425/403 |
| 4,266,926 | 5/1981 | Gordon | 425/393 |
| 4,430,052 | 2/1984 | Olsson | 425/392 |

Primary Examiner—Willard E. Hoag
Attorney, Agent, or Firm—Steele, Gould & Fried

[57] ABSTRACT

A vaccuum mandrel for forming a plastic pipe and inserting a seal ring in a groove in the pipe. The mandrel has plural segments mounted on inclined dowels so as to be expandible.

5 Claims, 6 Drawing Figures

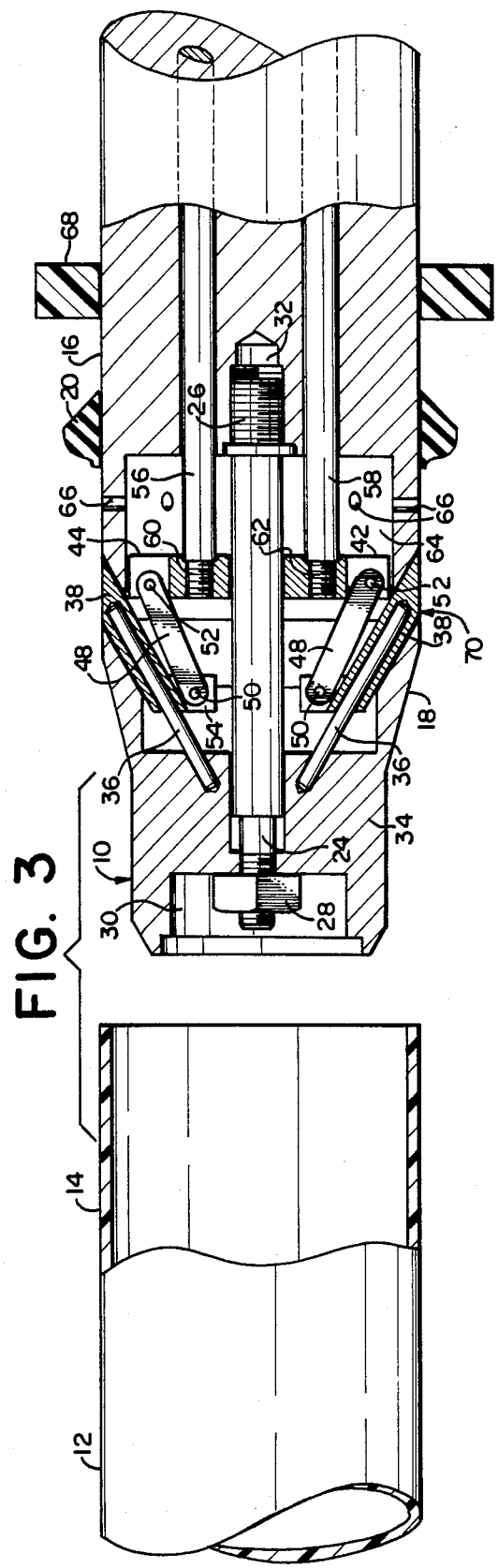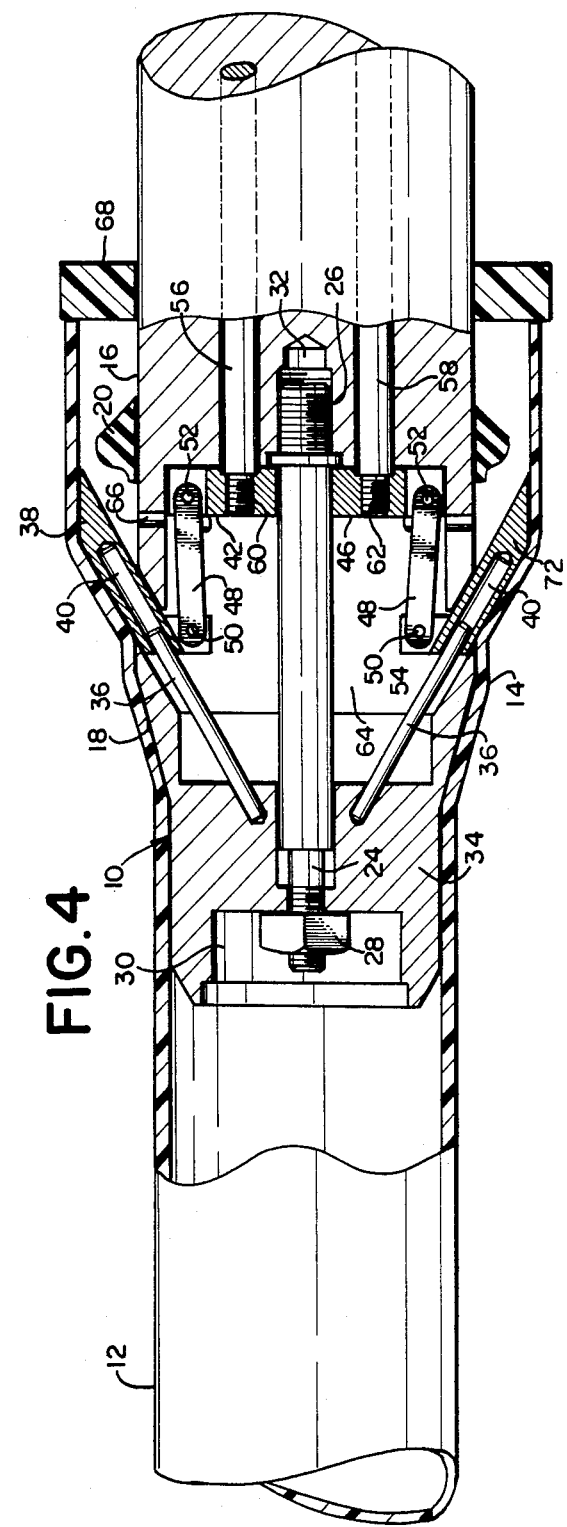

EXPANDING MANDREL

BACKGROUND OF THE INVENTION

1. Field of the Invention

The present invention relates generally to the field of machinery for forming bells or sockets in one end of length of plastic pipe to permit joining adjacent lengths of plastic pipe in end to end juxtaposition by inserting the unbelled or spigot end of one lengths of plastic pipe into the bell or socket which is formed in the proximate end of the next adjacent length of pipe.

2. Description of the Prior Art

In prior art types of pipe belling equipment, it has been known to position a shaped mandrel of predetermined configuration and size within a belling machine and to serially advance discrete lengths of plastic pipe, each having one end preheated, into axial alignment with belling mandrel. Suitable operating mechanisms have been developed and have been utilized to either axially move the pipe onto and over the mandrel or alternately, to axially move the mandrel into the heated end of the pipe for pipe end shaping into the desired bell or hub-shaped configuration. In certain designs, the prior pipe belling operations have been conducted within a suitable environmental chamber whereby pressure could be introduced into the chamber and about the pipe to press the preheated, softened pipe walls uniformally against the outer periphery of the mandrel. In my co-pending application Ser. No. 635,803 entitled "Pressure Chamber", filed July 30, 1984, one such environmental chamber has been fully set forth.

In accordance with more recent popular practice, it has become increasingly important to provide an internal groove in the bell configuration when the bell or hub shape was formed to provide a convenient annular groove to seat therein a sealing gasket in a manner to facilitate the making up of a leak proof junction between adjacent lengths of pipe in a piping system. U.S. Pat. No. 4,238,180 entitled "Mandrel With Identical Expanding Segments" is exemplary of a belling mandrel which incorporates construction features suitable to apply a circular, internal groove in the hub configuration for receipt of a gasket therein when the bell or hub of the plastic pipe is being formed.

However, so far as is known to the present applicant, despite all of the efforts of the many prior workers in the field to improve the joining procedures and constructions when utilizing plastic pipes, the seating of a sealing gasket in the junction between the spigot end of one length of pipe and the hub end of the next adjacent length of pipe, either with or without a peripheral internal groove formed in the hub, has always required a separate, relatively time consuming operation to properly install and seat a sealing gasket in proper position to seal the pipe junction against leakage.

SUMMARY OF THE INVENTION

The present invention relates generally to the field of belling mandrels, and more particularly, is directed to a mandrel and belling construction that is capable of both forming a desired hub-shaped profile in one heated end of a length of plastic pipe and simultaneously positioning and securing a sealing gasket in a hub construction.

The expanding mandrel of the present invention includes a body of generally circular configuration which is forwardly configured to a shaped profile or nose to form the desired bell shaped configuration in one preheated end of a length of plastic pipe. Preferably, a plurality of plastic pipes can be automatically and successively fed to the mandrel in known manner. It is the primary object of this invention to apply a rubber or other resilient material gasket over the mandrel body just prior to belling and then to form the bell shape in the pipe end about the gasket in a manner whereby the gasket will shape an annular portion of the bell and will become encapsulated therein during the belling procedures.

The expanding mandrel comprises a plurality of radially expanding and contracting segments which are expandable from an initial retracted position of size or diameter to allow the gasket to slide thereover to a final expanded position wherein the outer diameter of the circle subscribed by the outer peripheries of the expanding segments is greater than the outer diameter of the gasket. In this manner, the segments serve as a ramp or shield to direct the heated pipe and over the gasket when the pipe end is urged over the mandrel.

The body of the mandrel is provided with an operating cavity within which an operating plate is reciprocal between a forward position and rearward position. A plurality of links respectively connect the operating plate with inward portions of the expanding segments whereby when the operating plate is urged to its forwardmost position within the cavity, the expanding segments will be urged to their respective retracted positions. When the operating plate is pulled within the operating cavity to its rearwardmost position, the operating plate, functioning through the plurality of links, will act to urge the plurality of expanding segments to their outermost or expanded positions. With the segments in their respective expanded positions, one heated end of a length of a plastic pipe can be urged over the nose of the mandrel and over the expanded segments to thereby increase the diameter of the heated end of the pipe sufficiently to override the outer periphery of the gasket. Once the plastic pipe is applied over the gasket, the operating plate can be reciprocated forwardly to thereby contract the expanded segments and allow the heated end of the pipe to form about the unexpanded profile of the mandrel and about the gasket.

In the illustrated embodiment, the operating cavity is provided with suction means and a plurality of suction openings which can be positioned to apply suction forces interiorly of the heated end of the plastic pipe to thereby pull the plastic pipe into intimate overall contact with the outer periphery of the mandrel to form the desired bell-shaped configuration in the pipe end and to simultaneously encapsulate or entrap the gasket within the bell-shaped end. Alternately, as set forth in my said copending application Ser. No. 635,803, a pressure chamber could be applied about the expanding mandrel in a manner to urge the plastic pipe into intimate contact with the outer periphery of the mandrel by applying uniform pressure forces about the pipe to similarly impress the desired bell-shaped configuration in the plastic pipe with the gasket secured therein. It is noteworthy that the gasket serves a pipe end shaping function in conjunction with the shaping function of the mandrel whereby the heated end of the pipe will assume the shape of the mandrel with the outer peripheral shape of the gasket superimposed thereon.

It is therefore an object of the present invention to provide a novel expanding mandrel of the type set forth.

It is another object of the present invention to provide an expanding mandrel including body means to receive a gasket on the outer periphery thereof, forward expanding segment means to expand a portion of the mandrel to an outer diameter that is greater than the outer diameter of the gasket, means to apply a heated end of the pipe over the expanded segments and over the gasket, means to retract the expanding segments after the pipe has been applied and means to urge the pipe into overall intimate contact with the outer periphery of the mandrel and the gasket to entrap the gasket within the bell-shaped end.

It is another object of the present invention to provide an expanding mandrel construction including a body, a shaped nose affixed to the body, an operating cavity intermediate the nose and the body, an operating plate reciprocal within the cavity, a plurality of expanding segments having interior portions exposed within the cavity and connected through linkage to the operating plate within the cavity, the links being reciprocal between forward, retracted positions and rearward, expanded positions upon reciprocation of the operating plate and means to draw a preheated end of a length of plastic pipe into intimate, overall contact with the outer peripheral surface of the mandrel and the outer peripheral surface of a gasket positioned upon the body to impress a bell-shaped configuration in the pipe end and to permanently affix the gasket within the shaped end of the pipe.

It is another object of the present invention to provide a novel expanding mandrel comprising a generally cylindrical body, a shaped nose or profile forwardly affixed to the cylindrical body, a cavity intermediate the profile and the body, an operating plate that is reciprocal within the cavity between a forward position and a rearward position, an externally positioned operator to reciprocate the operating plate within the cavity, a plurality of segments in the profile that are radially expandable between retracted positions and expanded positions, the expanding segments being connected by pivotal linkage to the operating plate in a manner to be expanded and contracted as the plate is reciprocated by the operator, a gasket overfitting the body of the mandrel rearwardly of the expanding segments, means to urge a preheated end of a length of plastic pipe over the mandrel nose, the expanded segments, the mandrel body and the gasket and means to pull portions of the heated end of the pipe into intimate overall contact with the mandrel and the gasket to secure the gasket within the shaped configuration that is formed in the end of the pipe once the pipe has cooled.

It is another object of the present invention to provide a novel expanding mandrel construction that is rugged in construction, automatic in operation and reliable when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 3 is a side elevational view of the parts of FIG. 1, partly in section and illustrating the expanding segments in their retracted positions.

FIG. 4 is a side elevational view similar to FIG. 2, showing the expanded segments in their expanded positions and showing the heated end of the length of plastic pipe applied over the expanded segments and over the gasket.

DESCRIPTION OF THE PREFERRED EMBODIMENT OF THE INVENTION

Figure 1:
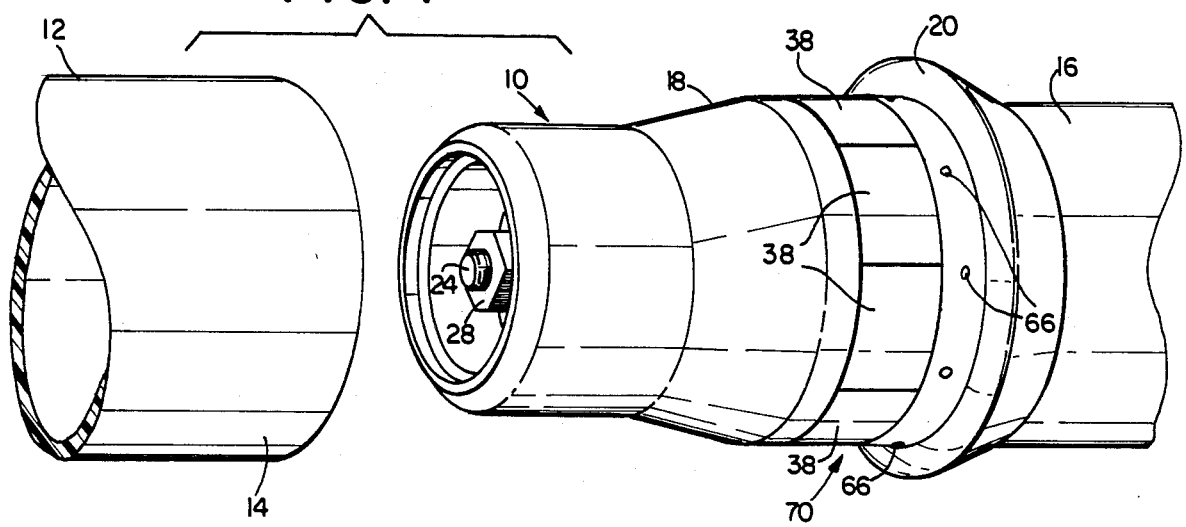
FIG. 1 is a perspective view showing the expanding mandrel juxtaposed to one end of a length of pipe with a gasket applied over the mandrel and with the plurality of expanding segments in their retracted positions.

Although specific terms are used in the following description for the sake of clarity, these terms are intended to refer only to the particular structure of the invention selected for illustration in the drawings, and are not intended to define or limit the scope of the invention.

Referring now to the drawings, there is illustrated a mandrel 10 of the type utilized to form a bell-shaped configuration 22 in one end 14 of a length of plastic pipe 12. The mandrel 10 comprises generally a cylindrical body portion 16 and a shaped profile or nose portion 18. As best seen in FIGS. 3 and 4, a guide rod 24 is provided in longitudinal alignment within the mandrel and has a threaded end 26 threadedly secured within the threaded opening 32 which is provided in known manner in the body 16. The forward end of the guide rod 24 terminates within the profile forward cavity 30 and is secured therein by employing a conventional nut 28 in well known manner.

Figure 2:
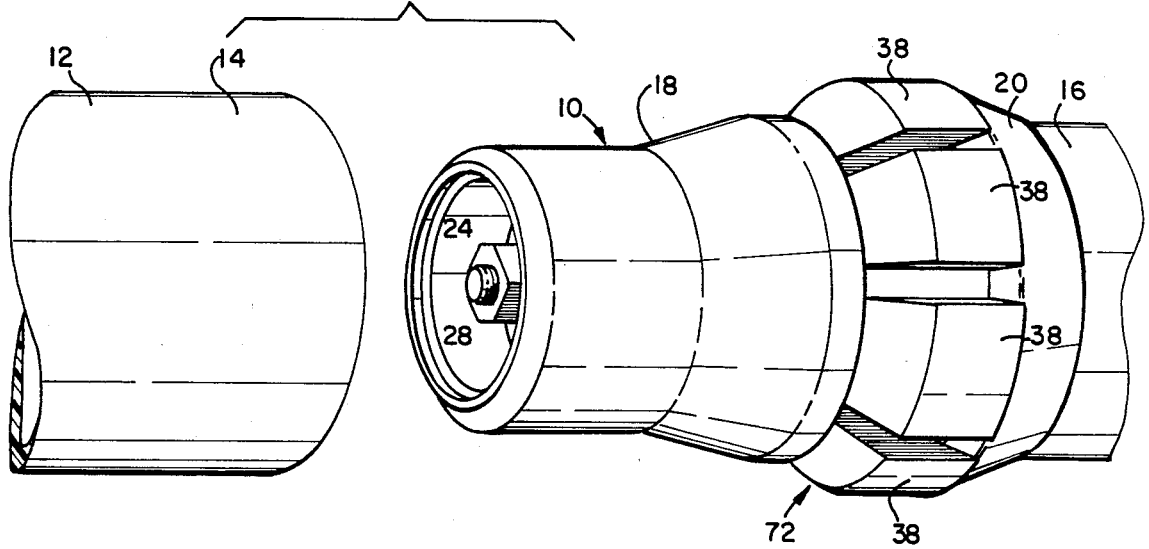
FIG. 2 is a view similar to FIG. 1 showing the expanding segments moved to their respective expanded positions.

As best seen in FIGS. 1, 2, 3 and 4, the mandrel profile portion 18 is equipped with a plurality of similar expanding segments 38 to facilitate the application of the heated pipe end 14 on the mandrel 10 and over a circular gasket 20 which can be manually or automatically positioned on the mandrel in the manner hereinafter more fully set forth. The plurality of segments 38 are reciprocal between their respective contracted positions 70 (FIGS. 1 and 3) and of their respective expanded positions 72 as illustrated in FIGS. 2 and 4. In the contracted position 70, the segments are circularly juxaposed and form a complete, cylindrical portion of the mandrel shaped profile or nose 18. In their respective expanded positions 72, the plurality of segments 38 are urged radially outwardly and rearwardly to define a circular outer periphery of diameter greater than the outer diameter of the gasket 20 whereby the heated pipe end 14 can be easily applied over the gasket 20 at the initiation of the pipe belling operation. (See FIG. 4.) Preferably, the segments include forwardly inclined ramps to facilitate expanding the heated pipe end sufficiently to clear the gasket 20 as the pipe is axially moved to contact the stop ring 68.

Referring now particularly to FIGS. 3 and 4, it will be observed that a plurality of radially outwardly and rearwardly positioned guide dowels 36 are equally, circularly spaced about the guide rod 24 and are securely seated within the forward nose block 34. One such guide dowel 36 is provided for each of the expanding segments 38 whereby each expanding segment 38 will travel longitudinally along its respective guide dowel 36 when the segments are reciprocated between their contracted and expanded positions 70, 72. Each segment 38 is provided with an elongated dowel opening 40 of suitable size and configuration to facilitate sliding engagement of each segment 38 upon its associated guide dowel 36.

Still referring to FIGS. 3 and 4, an operating plate 42 is reciprocal within an operating cavity 64 provided between the mandrel body 16 and the mandrel nose 18. The operating plate 42 is formed with a concentric guide opening to provide a sliding engagement between the operating plate 42 and a bearing portion of the guide rod 24. One or more operating rods 56, 58 may be reciprocated through the mandrel body 16 in well known manner, for example by employing an exteriorly mounted hydraulic cylinder (not illustrated) secured within the operating plate in known manner, for example, by utilizinging sturdy, threaded connections 60, 62 to reciprocate the operating plate 42 within the mandrel operating cavity 64 between a forward position 44 as illustrated in FIG. 3 to a rearward position 46 as illustrated in FIG. 4 when the hydraulic cylinder or other exterior operator is activated.

Each of the expanding segments 38 has a radially inward portion equipped with a pivot bracket 54, which bracket is exposed within the mandrel cavity 64. Individual links 48 connect each pivot bracket 54 with a peripheral portion of the operating plate 42. Forward and rearward pivot pins 50, 52 pivotally connect each link 48 respectively with an expanding segment bracket 54 and the operating plate 42 in pivotal connections.

Thus it is seen that when the operating rods 56, 58 are activated to push the operating plate 42 forwardly as illustrated in FIG. 3, the plurality of interconnecting links 48 will function to push the segments radially inwardly and forwardly along the associated guide dowels 36. In this position, the outer peripheries of the expanding segments 38 will be pulled into circular alignment whereby adjacent portions of the adjacent expanding segments 38 contact each other and the diameter of the outer circular periphery defined by the segments 38 is equal to the diameter of the outer periphery of the mandrel body 16. In this position, as illustrated in FIG. 3, the maximum diameter of the outer periphery of the gasket 20 will be greater that the contracted diameter of the circle defined by the expanding segments 38.

As illustrated in FIG. 4, when the operating rods 56, 58 are reciprocated to the right to thereby pull the operating plate 42 to its rearward position 46, the plurality of links 48, functioning through the plurality of forward and rearward pivot pins 50, 52, serve to pull each of the segments 38 respectively radially outwardly and rearwardly by sliding along the plurality of guide dowels 36 to their expanded positions 72. As illustrated, when the segments 38 are pulled to their respective expanded positions 72, the segments 38 will define a circular periphery that is greater in diameter than the diameter of the outer periphery of the gasket 20. With the segments remaining in their expanded position 72, the heated end 14 of the pipe 12 can be applied over the mandrel shaped profile 18 and over the outer periphery of the segments 38. As illustrated, the foward end of the heated pipe portion 14 will expand over the forward slopes of the segments and will stop against the stop ring 68. The pipe end will be expanded over the gasket 20 without actually ever touching the gasket.

A plurality of environmental openings 66 extend radially outwardly through a portion of the mandrel profile to communicate the interior of the operating cavity 64 with the atmosphere immediately surrounding the mandrel 10. By applying suction forces within the operating cavity 64 in manner well known to those skilled in the art, the suction forces can be imposed interiorly of the heated pipe end 14 to draw the interior periphery of the pipe tightly against the outer periphery of the mandrel 10 and about the gasket 20. Optionally, in lieu of employing suction within the operating cavity 64 to apply vacuum forces through the suction openings 66, the mandrel could be positioned within a pressure chamber in the manner illustrated and taught in my said copending application Ser. No. 635,803 to thereby press the heated end of the pipe against the mandrel 10 and over and about the gasket 20.

In order to use the expanding mandrel 10 of the present invention to impress a bell or hub shape 22 in one end of a length of pipe 12, the pipe end 14 is first heated in a manner well known to those skilled in the art to become pliable enough to permit the bell forming operations to take place. While the pipe end 14 is being heated, an air cylinder (not shown) or other type of exterior operator (also not shown) which is employed to reciprocate the operating rods 56, 58 is functioned to push the operating rods 56, 58 forwardly to forwardly move the operating plate 42 to its forward position 44. In this position, the operating plate 42 will cause the plurality of segments 38 to slide forwardly and radially inwardly along their associated guide rods 36 until the outer periphery defined by the plurality of segments 38 is reduced in diameter to equal the diameter of the mandrel body 16.

With the plurality of segments 38 reciprocated to their contracted positions 70, a resilient gasket 20 can be urged over the profile or nose 18 of the mandrel 10 to a predesignated rearward position upon the mandrel forwardly of the stop ring 68. While it is contemplated at the present time to position the resilient gasket 20 upon the mandrel by employing manual operations, it is expected that this operation can be and will be automated whereby the gasket 20 can be automatically applied over the mandrel prior to the initiation of the belling cycle.

Once the resilient gasket 20 has been properly positioned and seated upon the mandrel forwardly of the stop ring 68, the operating rods 56, 58 will be reciprocated in known manner rearwardly and will pull the operating plate 42 rearwardly along the guide rod 24 to the rearward position 46 as illustrated in FIG. 4. In this position, the operating plate 42, functioning through the plurality of connecting expanding links 48 will pull simultaneously the expanding segments 38 rearwardly and radially outwardly along the plurality of guide dowels 36 to the expanded position 72. When the expanding segments 38 are urged to their expanded positions 72, the diameter of the circle defined by the outer periphery of the segments 38 will be greater than the outer diameter of the gasket 20. With the expanding segments 38 in the said expanded position 72, the pipe 12 can then be urged axially over the mandrel shaped profile 18 and over the expanded shape defined by the segments 38 when in their expanded position 72. It is noteworthy that the heated and expanded pipe end 14 will clear the gasket 20 inasmuch as the diameter of the expanded segment section will be greater than the diameter of the gasket 20. Preferably, a stop ring 68 is provided to form a convenient stop to properly and securely position the pipe 12 for optimum belling during the belling operation. See FIG. 4.

Figure 5:
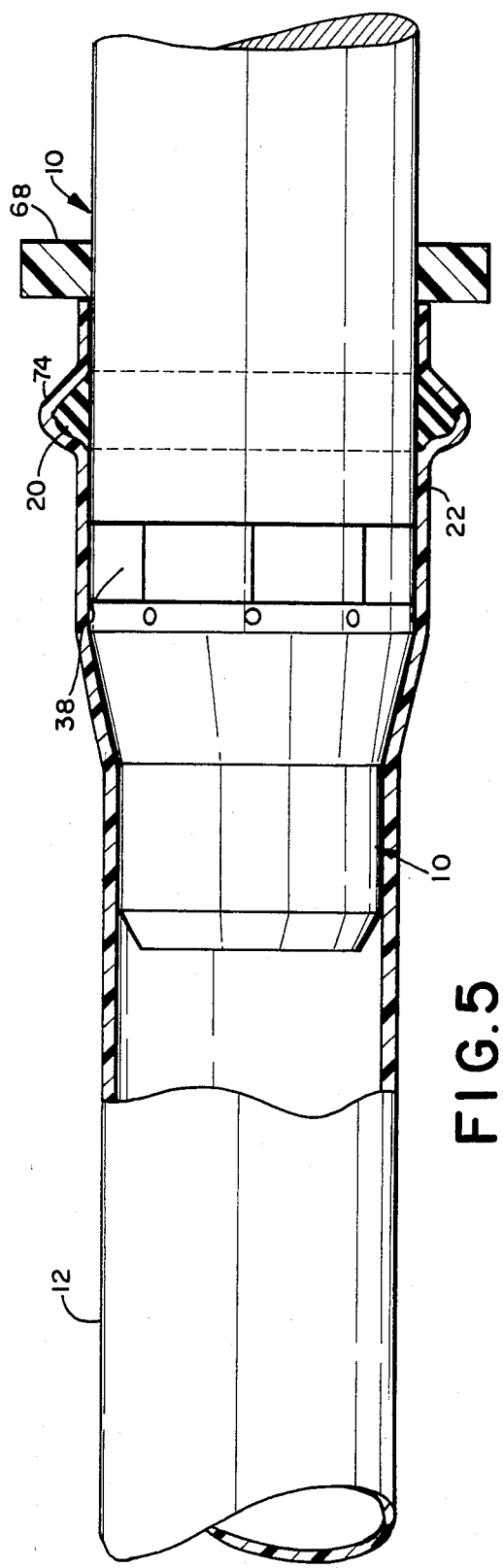
FIG. 5 is a side elevational view similar to FIG. 1, partly broken away, showing the end of the pipe in intimate contact with the mandrel profile and the gasket.

With the parts so positioned, the exterior operator (not shown) utilized in conjunction with the operating rods 56, 58, will again be activated to push the rods 56, 58 forwardly and thus urge the operating plate 42 forwardly to radially inwardly and forwardly move the segments 38 from their expanded position 72 as illustrated in FIG. 4 to the contracted position 70 illustrated in FIG. 5. Once the segments 38 are urged to their contracted position 70, forces other than atmospheric are employed to press the heated end 14 of the pipe 12 into intimate, overall contact with the outer periphery of the profile and the outer periphery of gasket 20. In the illustrated embodiment, it is comtemplated that suction forces will be introduced within the operating cavity 64 and these suction forces, operating through the plurality of suction openings 66 will cause the pipe end into intimate overall contact with the mandrel profile 18 and the gasket 20.

With the parts in the position illustrated in FIG. 5, the end of the pipe 12 can then be cooled rapidly in known manner, for example by applying a cooling liquid (not shown) to set the plastic in the desired bell-shaped configuration and to encapsulate the gasket 20 within an annular ring shape 74 which has been formed in the pipe end. Once the pipe end has cooled and with the expanding segments 38 still in their respective contracted position 70, the pipe 12 can then be removed axially from the mandrel 10 in known manner and the belling operation can be repeated with the next serially advancing length of plastic pipe. (Not shown).

Figure 6:
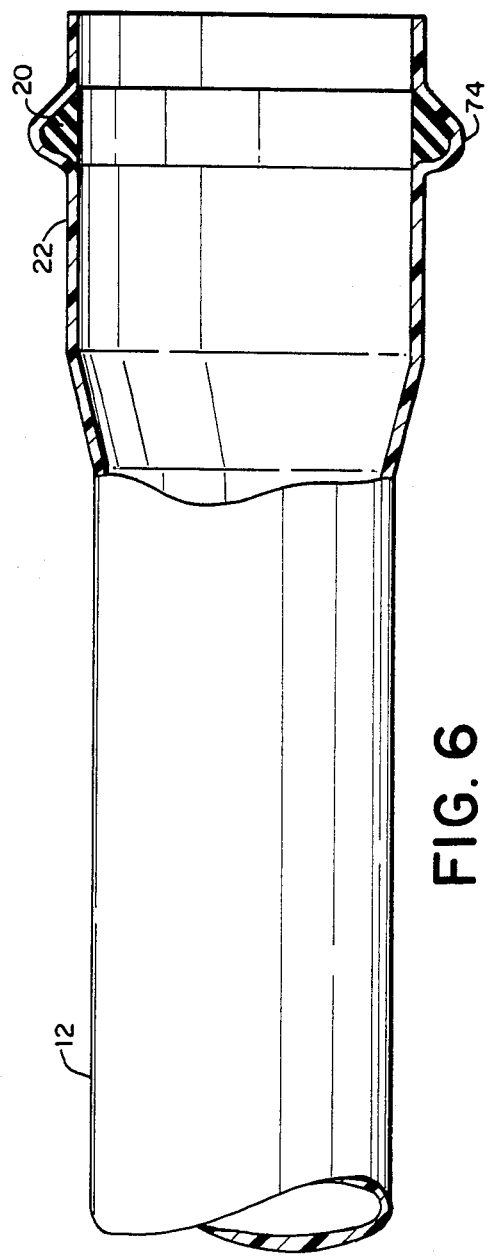
FIG. 6 is a view similar to FIG. 5 showing the pipe removed from the mandrel, with the parts broken away to expose interior construction details.

As illustrated in FIG. 6, the operation of the expanding mandrel 10 of the present invention produces a finished, bell shaped configuration 22 in one end of a length of plastic pipe 12 with a resilient gasket 20 permanently secured therein to facilitate making up the junctions between adjacent lengths of pipe when a piping system (not illustrated) is to be fabricated. It will be appreciated that the operation of the operating plate, the suction forces and the movement of the pipe axially onto and off mandrel can be automated in well known manner to provide a completely automatic, cyclical operation that is capable of successively belling a plurality of plastic pipes as they are serially advanced to the belling mandrel. Additionally, as above set forth, if desired, it would also be possible to automate the placing of the gasket upon the mandrel at the start of each belling cycle.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. In a pipe belling mandrel, of the type comprising a cylindrical body adapted to receive thereon a circular gasket having an outer diameter, a shaped profile axially secured to the body to impress a bell-shaped configuration in a preheated end of a length of plastic pipe, a plurality of movable segments positioned intermediate the body and the profile, the segments being movable between a contracted position wherein the outer peripheries of the segments form a portion of the outer periphery of the body and an expanded position wherein the outer peripheries of the segments define an outer diameter that is greater than the outer diameter of the body, and forces other than atmospheric are applied to the mandrel to force the preheated pipe end against the profile and against the gasket, the improvement comprising a stop ring secured to the mandrel rearwardly of the segments, the stop ring having an outer diameter that is greater than said outer periphery defined by the segments when the segments are moved to their said expanded positions,
the gasket being positioned on the body intermediate the stop ring and the said segments;
a plurality of guide dowels secured within the mandrel interiorly of the shaped profile,
the guide dowels being equally spaced about a central guide rod, the guide dowels each being radially outwardly and rearwardly inclined;
each segment being simultaneously longitudinally and radially movable along a respective guide dowel between its said contracted position and its expanded position,
each segment comprising
an inclined forward surface and an arcuate outer surface, the outer surface of each segment extending rearwardly from the outer edge of the forward surface, the combined outer surfaces of the segments defining an outer periphery when the segments are moved to their said expanded positions of diameter greater than the outer periphery of the said gasket,
the combined outer surfaces of the segments defining an outer periphery when the segments are moved to their said contracted positions of diameter equal to the outer diameter of the cylindrical body;
the combined outer surfaces of the segments defining an outer periphery when the segments are moved to their said expanded positions of diameter greater than the outer diameter of the gasket;
whereby the preheated end of the pipe will contact the inclined forward surfaces of the segments during belling and will be expanded to a diameter sufficient to allow the preheated pipe end to slide over the gasket when the pipe is applied to the mandrel and wherein the gasket will be removed from the mandrel and encapsulated in the belled pipe end upon completion of the pipe belling operation.

2. The mandrel of claim 1, wherein all of the segments are identical in configuration.

3. The mandrel of claim 1, wherein the body has a longitudinal axis and wherein the dowel pins are oriented in angular relationship to the said axis.

4. The mandrel of claim 3, wherein axes respectively drawn through the dowel pins intersect at said longitudinal axis.

5. The mandrel of claim 4, wherein the gasket comprises an annulus having an inner diameter, the gasket inner diameter being greater than the outer periphery of the profile when the segments are moved to their said contracted positions, whereby the gasket can be applied over the mandrel prior to belling to subsequently be encapsulated within the belled pipe end.

* * * * *